United States Patent [19]

Suechting

[11] 3,802,323

[45] Apr. 9, 1974

[54] PISTON AND PISTON ROD ASSEMBLY FOR HYDRAULIC JACK

[75] Inventor: William G. Suechting, Okauchee Lake, Wis.

[73] Assignee: Hein-Werner Corp., Waukesha, Wis.

[22] Filed: Nov. 17, 1972

[21] Appl. No.: 307,339

Related U.S. Application Data

[63] Continuation-in-part of Ser. No. 152,955, June 14, 1971, abandoned.

[52] U.S. Cl. ............... 92/140, 92/168, 92/187, 92/249
[51] Int. Cl. ............... F01b 9/00, F16j 1/14
[58] Field of Search ........... 287/20 P, 85 A, 21, 87, 287/90 R; 277/212 F, 212 FB; 92/140, 168, 179, 187, 240, 249, 248

[56] References Cited
UNITED STATES PATENTS

| | | | |
|---|---|---|---|
| 569,574 | 10/1896 | Caldwell | 60/482 |
| 1,448,624 | 3/1923 | Gordon | 92/240 |
| 2,037,434 | 4/1936 | Pfauser | 417/440 |
| 2,120,922 | 6/1938 | Rasmussen | 74/18.2 |
| 2,292,675 | 8/1942 | Thiry | 287/85 A |
| 2,293,582 | 8/1942 | Whittingslowe | 287/90 R |
| 2,520,426 | 8/1950 | Mueller | 60/467 |
| 2,791,454 | 5/1957 | Saives | 287/85 A |
| 2,878,046 | 3/1959 | Latzen | 287/87 |
| 2,921,808 | 1/1960 | David | 287/87 X |
| 3,125,004 | 3/1964 | White | 92/249 X |
| 3,498,622 | 3/1970 | Belart | 74/18.2 |
| 3,695,651 | 10/1972 | Stuck | 287/87 |

FOREIGN PATENTS OR APPLICATIONS 716,867  1/1942  Germany ........................... 92/240

*Primary Examiner*—Irwin C. Cohen
*Attorney, Agent, or Firm*—Michael, Best & Friedrich

[57] ABSTRACT

A nylon piston member is mounted for reciprocal movement in a piston cylinder and has a socket formed in one end thereof. The piston member is operatively connected to an actuating handle by a piston rod member having one end pivotally connected to the handle and having a ball portion formed on the other end adapted to be snapped into the socket formed in the end of the piston for retention in such socket. The ball on the piston rod may be provided with a rearwardly facing shoulder to insure secure retention of the ball in the socket formed in the piston and to prevent a wedging action which would tend to expand the piston thereby increasing friction between piston and cylinder.

8 Claims, 5 Drawing Figures

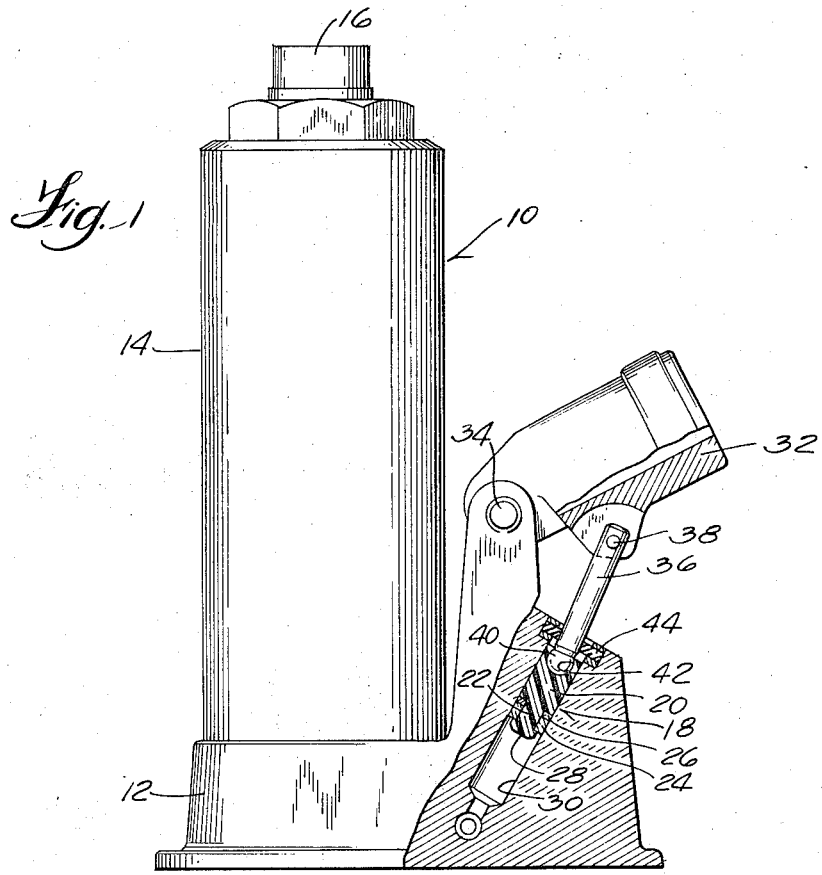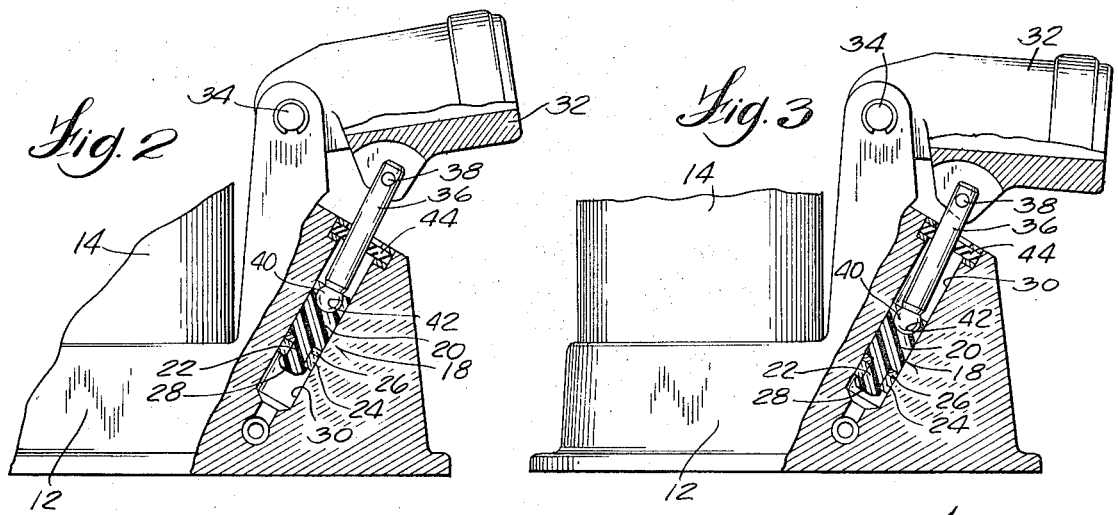

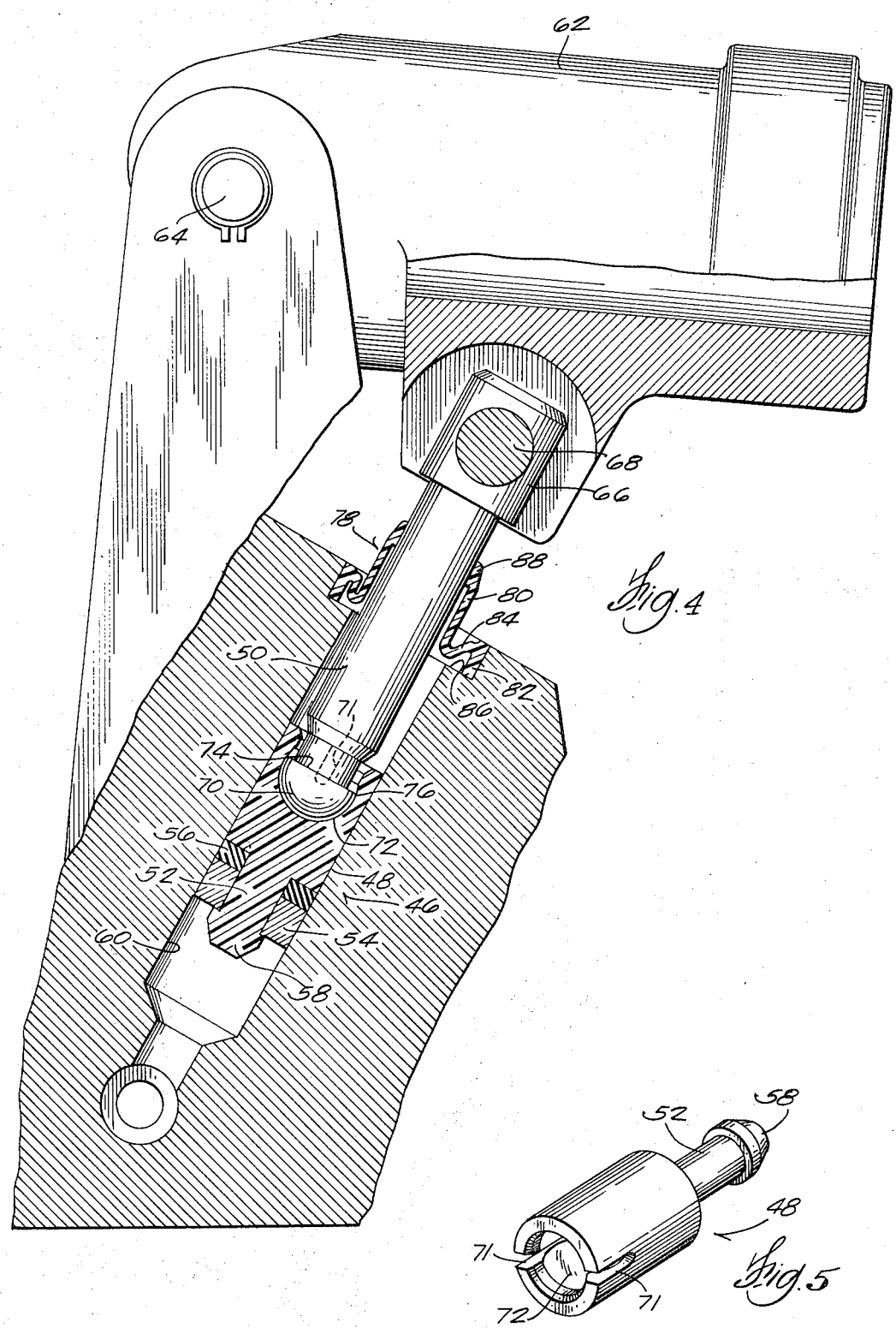

PISTON AND PISTON ROD ASSEMBLY FOR HYDRAULIC JACK

CROSS REFERENCE TO RELATED APPLICATIONS

This application is a continuation-in-part of application Ser. No. 152,955, filed June 14, 1971, now abandoned, and assigned to the present assignee.

BACKGROUND OF THE INVENTION

1. Field of Invention

This invention relates to a hydraulic piston and piston rod assembly for a hydraulic jack.

2. Description of Prior Art

In many prior arrangements the conventional approach was to connect the hydraulic piston directly to the jack actuating handle. With such an arrangement excessive friction and wear often resulted between the moving parts. One object of the present invention is to provide an improved arrangement wherein friction and consequent wear of the moving parts is kept to a minimum.

A further object is to provide an arrangement which is comprised of a relatively inexpensive piston and piston rod which can be easily mass produced and assembled by a snap action.

Another object is to provide a piston and piston rod arrangement which is not only easy to assemble by snap action but once assembled and installed in the piston cylinder will remain securely in assembled condition and will provide a minimum of wear between the piston and the piston cylinder.

A further object is to provide an improved wiper member for sealing the open end of the piston cylinder into which the piston rod extends.

Other objects and advantages of this invention will be pointed out in or be apparent from the description and claims that follow.

SUMMARY OF THE INVENTION

A hydraulic piston for a hydraulic jack and an actuation mechanism for the piston which includes an actuating handle pivotally mounted on the jack and a piston and piston rod assembly mounted for reciprocal movement in a piston cylinder. The piston member is preferably made of a semi-rigid plastic material such as nylon and has a socket formed in one end thereof. The piston rod member is preferably made of metal and has one end pivotally connected to the actuating handle and has a ball portion formed on the other end for retention in the socket formed in the end of the piston. The socket formed in one end of the nylon piston is slightly deformable, permitting the ball formed on the piston rod to be assembled therewith by a simple snap action. When the piston and piston rod assembly are installed in the piston cylinder, the walls of the cylinder will serve to restrain any tendency of the walls of the socket to be deformed outwardly to thus prevent disassembly of the two parts during operation of the jack. The ball on the piston rod may be provided with a rearwardly facing shoulder to insure secure retention of the ball in the socket during the outward stroke of the piston. A specially designed sealing member having an S-shaped cross-section is provided to seal the open end of the piston cylinder through which the piston rod extends. A U-cup member and a back-up washer are mounted on the forward end of the piston to provide a seal between the piston and the piston cylinder. The U-cup member and back-up washer are mounted on a tip portion formed on the end of the piston member and such members are retained on the tip portion by an enlarged head formed on the end of the tip portion.

DESCRIPTION OF THE DRAWINGS

FIG. 1 is a side elevation view of a jack embodying the hydraulic piston assembly and actuating mechanism of the present invention, with a part of the base portion of the jack broken away to show the detailed construction of the piston assembly and actuating mechanism;

FIGS. 2 and 3 are views similar to FIG. 1 but showing the parts in a different operative position;

FIG. 4 is a side elevation view of a jack showing a second embodiment of the hydraulic piston assembly and actuating mechanism of the present invention, with a part of the base portion of the jack broken away to show the detailed construction of the piston assembly and actuating mechanism; and FIG. 5 is a perspective view of the piston member shown in FIG. 4.

DESCRIPTION OF THE PREFERRED EMBODIMENTS

Referring to the drawings in detail, FIGS. 1, 2 and 3 show a portable hydraulic jack indicated generally by the reference numeral 10, having a base 12, a body portion 14 and a lift member 16. As indicated previously, the present invention relates particularly to the construction of the hydraulic piston assembly and actuating mechanism therefor and as such can be usefully employed with hydraulic jacks of any suitable design. Accordingly, the detailed construction of the lift mechanism, hydraulic valving arrangement, fluid reservoir, etc. of jack 10 will not be described in detail herein. For an example of a hydraulic jack of the type with which the present invention could be used reference is made to U.S. Pat. No. 2,527,428.

The novel piston and piston rod assembly of this invention is indicated generally by reference numeral 18. Assembly 18 is comprised of a piston member 20 which in the preferred embodiment is in the form of a molded nylon part having a tip portion 22 formed integrally therewith and a piston rod 36 made preferably of metal such as steel. A U-cup member 24 and a back-up washer 26 are mounted on tip portion 22. The U-cup and washer are retained on the tip portion by an enlarged head portion 28. The parts are assembled by simply pressing them over the enlarged head 28 to the position shown in the drawings. In the preferred embodiment U-cup 24 is made of neoprene and back-up washer 26 is made of leather. The U-cup and leather washer serve to provide a seal between the piston and the piston cylinder 30 in which the piston is reciprocated in the normal operation of the jack.

The piston and rod assembly 18 is reciprocated by a manually actuated handle 32 which is pivotally mounted on the base 12 of the jack by a pin 34. Handle 32 is operatively connected to piston 20 by piston rod member 36. Rod member 36 is pivotally connected at one end to handle 32 by a pin 38. The rod is connected at its other end to the end of piston member 20 by a ball and socket joint comprising a ball portion 40 formed on the end of rod 36 and a socket 42 formed in the end of piston 20. As indicated previously, piston member 20 is made from a semi-rigid plastic material such as nylon and thus the portion of the piston forming the socket 42 can be deformed slightly to permit easy assembly with the ball portion 40 of rod 36 by simply snapping the ball 40 into the socket. It will be appreciated in this regard that when the assembled piston 20 and rod 36 are installed for reciprocal movement in cylinder 30, the walls of the cylinder will serve to restrain any tendency of the walls of socket 42 to be deformed outwardly to thus prevent disassembly of the two parts during operation of the jack. A suitable seal assembly 44 is mounted in the open end of piston cylinder 30.

In use the above described apparatus operates as follows: As piston assembly 18 is reciprocated in cylinder 30 by manual actuation handle 32, the parts will sequentially assume the positions shown in FIGS. 1, 2 and 3. As shown in FIGS. 1 and 3, at the upper and lower end of the piston stroke rod member 36 is tilted slightly from the axis of piston cylinder 30. This tilting is freely accommodated by the ball and socket connection between the rod 36 and the piston 20. It will be appreciated that if the piston were connected directly to the actuating handle (as in many prior designs), there would be forces tending to cock the piston in the cylinder, causing excessive friction and consequent wear of the parts.

It should also be appreciated that the use of a piston made from plastic material (nylon) in the combination of this invention provides further important advantages. The plastic piston can be manufactured at less cost than if metal were used. As previously indicated, piston 20 and rod 36 can be readily assembled by snapping ball portion 40 on the rod into the socket 42 formed in the end of the piston to thus minimize assembly costs. In addition the plastic piston will slide in cylinder 30 with little friction, keeping wear to a minimum. Finally the plastic piston will be free from corrosion, which is an important consideration since there is often a tendency for moisture to accumulate in cylinder 30.

The second embodiment of the present invention shown in FIGS. 4 and 5 provides all the advantages referred to above and in addition provides certain further important advantages.

The piston and piston rod assembly of the second embodiment is indicated generally by reference numeral 46 and is comprised of a piston member 48 formed of a semi-rigid plastic material such as molded nylon and a piston rod member 50 made preferably of metal such as stainless steel. Piston 48 is provided with a tip portion 52 formed integrally therewith, having a U-cup member 54 and a back-up washer 56 mounted thereon. The U-cup and washer are retained on the tip portion by an enlarged head portion 56 and are assembled by simply pressing the two parts over the enlarged head 58 to the position shown in FIG. 4.

The piston and rod assembly 46 is reciprocated in piston cylinder 60 by a manually actuated handle 62 which is pivotally mounted on the base of the jack by a pin 64. Piston rod member 50 has an enlarged head 66 formed at one end thereof for pivotal connection to handle 62 by a pin 68. The rod 50 is connected at its other end to the end of piston member 48 by a ball and socket joint comprising a ball portion 70 formed on the end of rod 50 and a socket portion 72 formed at the end of piston 50.

As indicated previously, piston member 48 is made from a semi-rigid plastic material such as nylon and thus the portion of the piston forming the socket 72 can be deformed slightly to permit easy assembly with the ball portion 70 of rod 50 by simply snapping the ball 70 into the socket 72. As clearly shown in FIG. 5, socket portion 72 is provided with a pair of longitudinally extending slots 71 to facilitate deformation of the socket material and thereby facilitate the snap assembly of the two parts. It will be appreciated that when the assembled piston 48 and piston rod 50 are installed for reciprocal movement in piston cylinder 60, as shown in FIG. 4, the walls of the cylinder will serve to restrain any tendency of the walls of socket 72 to be deformed outwardly to thus prevent disassembly of the two parts during operation of the jack.

A further refinement of the piston and rod assembly 46 shown in FIG. 4 resides in the provision of a rearwardly facing shoulder 74 formed on the ball portion 70 which provides a relatively sharp circular edge 76. When the parts are assembled and installed in cylinder 60, as shown in FIG. 4, the circular edge 76 on metal rod 50 will tend to dig into the plastic interior spherical wall of socket 72 and thus provide added security to the joint, making it literally impossible to disasemble the parts when the piston is installed in the cylinder 60 by application of longitudinal forces as when the handle 62 is raised to cause an upward stroke of the piston 48. The relationship between edge 76 and socket 72 also tends to minimize the side pressure exerted on the socket wall by the ball 70 tending to force the plastic socket into contact with the wall of cylinder 60. Thus, the tendency of the parts to wear due to pressure between the parts in this area is substantially reduced.

A still further refinement of the embodiment shown in FIG. 4 is the provision of a novel wiper seal member 78 for sealing the open end of piston cylinder 60. Wiper member 78 is formed of a semi-rigid plastic material such as molded nylon and is comprised of an elongated cylindrical wiper portion 80 and a cylindrical base portion 82 connected together by a U-shaped hinge portion 84. The portions 80, 82 and 84 are formed integrally with each other and together provide a substantially S-shaped cross-section as shown in FIG. 4. Base portion 82 is seated in a countersunk portion 86 formed at the open end of cylinder 60 and remains stationary during reciprocation of the piston assembly. Wiper portion 80 is provided with an inwardly extending tip portion 88 formed at the end thereof and dimensioned to make snug wiping contact with piston rod 50 as the piston assembly is reciprocated. Hinge portion 84 permits wiper portion 80 to move relative to base portion 82 to thus accommodate the tilting movement of rod 50 from the axis of cylinder 60 during actuation of the jack as explained previously with respect to the FIG. 1-3 embodiment.

The basic operation of the jack embodiment shown in FIGS. 4 and 5 is the same as the previously described operation of the FIG. 1-3 embodiment. The FIG. 4-5 embodiment does provide certain significant advantages, however, namely, a ball and socket joint which is more secure and has better wearing characteristics due to the shoulder 74 on ball 70 and an improved seal for the cylinder 60 due to the novel design of wiper seal member 78.

I claim:

1. A cylinder, piston, and piston rod assembly for a hydraulic device comprising:
   an actuating handle including means for pivotally mounting said handle on the device;
   a piston cylinder in the device;
   a piston rod member including means for pivotally connecting one end of said piston rod to said actuating handle, said piston rod member having a ball portion formed on the other end thereof; and
   a piston member mounted for reciprocal movement in said piston cylinder, said piston member formed from a semi-rigid non-metallic material and having a deformable socket including slotted walls formed at one end thereof to facilitate snap assembly of the ball on the piston rod into the socket, the walls of the cylinder engaging the piston member and serving to restrain outward movement of said deformable socket to thus prevent disassembly of the piston and piston rod during actuation of the device.

2. A piston and piston rod assembly for a hydraulic jack according to claim 1 in which said piston member has a U-cup member and a back-up washer mounted on the other end thereof.

3. A piston and piston rod assembly for a hydraulic jack according to claim 2 in which said piston member has a tip portion having an enlarged head formed on said other end thereof, said U-cup member and back-up washer mounted on said tip portion and retained thereon by said enlarged head.

4. A piston and piston rod assembly for a hydraulic jack according to claim 3 in which said U-cup member is made of neoprene and said back-up washer is made of leather.

5. A piston and piston rod assembly for a hydraulic jack according to claim 1 in which the ball portion on said piston rod has a shoulder formed thereon to provide a relatively sharp circular edge which tends to dig into the deformable socket on said piston member.

6. A piston and piston rod assembly for a hydraulic jack according to claim 1 in which a wiper seal member is provided to seal the open end of said piston cylinder, said wiper seal member comprising an elongated cylindrical wiper portion and a cylindrical base portion connected together by a flexible hinge portion with said wiper portion dimensioned to make snug wiping contact with said piston rod member and with said base portion seated in the open end of said piston cylinder.

7. A piston and piston rod assembly for a hydraulic jack according to claim 6 in which said wiper portion, base portion and hinge portion are formed integrally with each other and together have a substantially U-shaped cross-section.

8. A cylinder, piston and piston rod assembly for a hydraulic device comprising:
   an actuating handle including means for pivotally mounting said handle on the device;
   a piston cylinder in the device;
   a piston rod member including means for pivotally connecting one end of said piston rod to said actuating handle, said piston rod member having a ball portion formed on the other end thereof, said ball portion having a shoulder formed thereon to provide a relatively sharp circular edge; and
   a piston member mounted for reciprocal movement in said piston cylinder, said piston member formed from a semi-rigid non-metallic material and having a deformable socket formed at one end thereof to facilitate snap assembly of the ball on the piston rod into the socket, the walls of the cylinder engaging the piston member and serving to restrain outward movement of said deformable socket when the piston assembly is mounted therein, said circular edge formed on said ball portion tending to dig into said deformable socket on said piston member to thus prevent disassembly of the piston and piston rod during actuation of the device and to minimize the side pressure exerted on the socket by the ball portion during operation of the device.

* * * * *